Feb. 12, 1929.  C. E. C. EDEY  1,702,030
AUTOMOBILE SPRING
Filed Aug. 15, 1927  2 Sheets-Sheet 1

INVENTOR
Charles E. C. Edey.
BY
ATTORNEY

Patented Feb. 12, 1929.

1,702,030

UNITED STATES PATENT OFFICE.

CHARLES E. C. EDEY, OF LOS ANGELES, CALIFORNIA.

AUTOMOBILE SPRING.

Application filed August 15, 1927. Serial No. 213,150.

This invention relates to automobile springs, and has for its primary object the provision of a flexible load distributing mechanism between the axle and the respective ends of the spring that will be immediately responsive to the action of shocks and jars imparted thereto, and which will result in absorbing the same so as to protect the occupants from the vibrations of a rough road and prevent the power plant and other parts from being unduly impaired incident to the effect of improper absorption of said shocks and jars.

A further object of the invention is to provide means whereby when a wheel of the vehicle is suddenly dropped into a hole or forced over an obstruction, the said means will function to transfer the load incident to sudden thrust, impact or stress to the spring ends so that as one end is subjected to a compressing action, the other end will be expanded, and whereby, and incident to my improved means, the body of the vehicle will be kept steady and the respective springs of a set made to take their shares of the loads and stress, without overtaxing the strength of any one spring.

A further object of the invention is to provide a spring wherein the body of a vehicle with which it is employed will have free undulatory yielding motion.

Other objects and advantages will be apparent as the following specification is read in conjunction with the accompanying drawings, in which Figure 1 is a front elevation of a portion of an automobile showing my invention applied thereto;

Figure 5 is a view on an enlarged scale through a portion of the rear axle showing parts of the invention on an enlarged scale.

Figure 1:
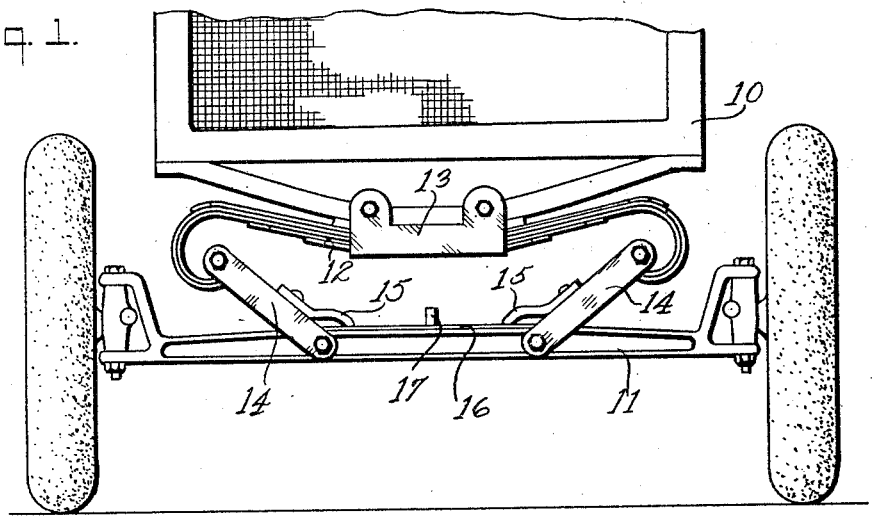
Figure 2:
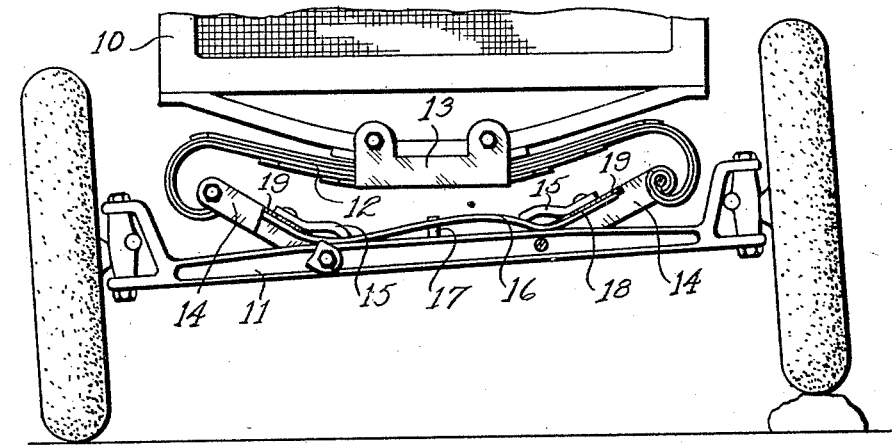
Figure 2 is a similar view with parts in section, showing the spring and its coacting parts in stressed positions.

Reference shall be had to Figures 1 and 2, wherein 10 represents a portion of an automobile including a front axle 11 of any well known construction, and 12 a semi-elliptic spring, the latter hung by a clip or bracket 13 to the body of the automobile.

At 14—14 are identical rocking links pivoted at their lower ends to the axle and at their upper ends to the respective ends of the said semi-elliptic spring 12. These links are extended upward in an upward and outward direction from points between the ends of the said axle and as illustrated they are provided with stop lugs 15 adapted to indirectly coact with the axle so as to limit upward movements of the links.

Superposed with respect to the axle 11 is a flat leaf spring 16 adapted to be flexed with respect to the axle, and as illustrated the central portion of the spring is adapted to work vertically on a stud 17 which rises from the axle medially thereof. The respective ends of the said spring are formed with angular portions 18 which always bear and exert their influence against portions 19 of the respective links 14—14 so as to assist in elevating these links on their lower pivots.

From the construction herein set forth it manifestly follows that through the respective actions of the links 14—14 the semi-elliptic spring 12 which extends in a longitudinal direction with the axle 11 will be capable of expanding at one of its ends while the other end of the spring is under compression, whereby and in effect the said semi-elliptic spring will expand longitudinally when in action and freely absorb the upward and other vibrations and shocks that are transmitted to the automobile.

The links 14—14 and their coacting stops 15 are so constructed and correlated and arranged in coaction with the flat leaf spring 16 that will cause the strengthening of one end of the spring 12 as the other end is weakened, thereby enabling the wheels of the vehicle to easily move upwardly when in contact with an obstruction along the highway. The spring 12, through the organized arrangement of the instrumentalities herein set forth automatically adapts itself to the varying loads and stresses applied thereto without overtaxing either end of the spring at any time, while giving to the vehicle a maximum measure of buoyancy. The equalizing effect of the various parts is such that movement imparted to one of the links 14 will be promptly transmitted to the other of said links through the axle 11.

Figure 3:
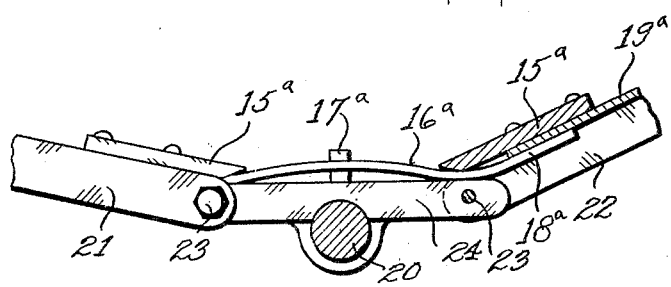
Figure 3 is a similar view showing an application of the spring to the rear axle of the automobile.
Figure 3:
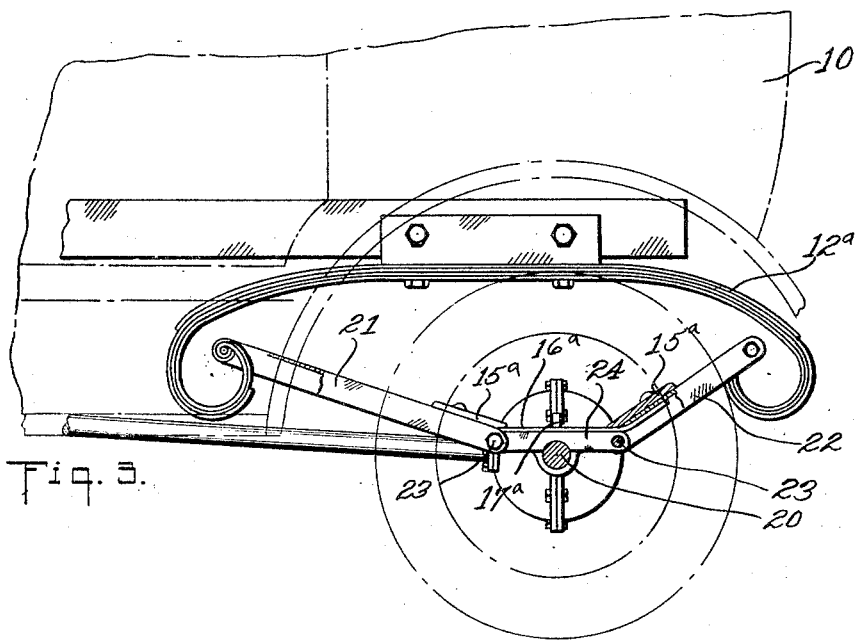
Figure 4:
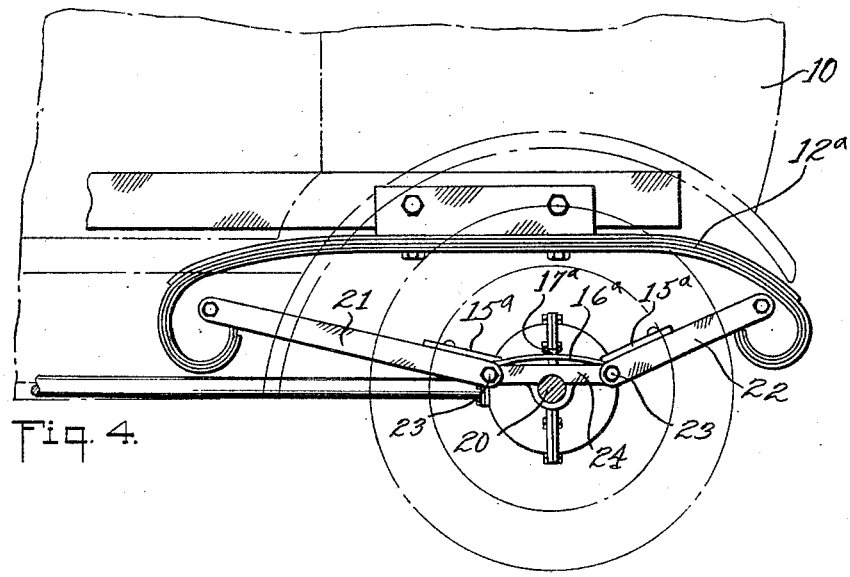
Figure 4 is a view similar to Figure 2, showing the spring and its coacting parts somewhat stressed beyond their normal positions.

In Figures 3 and 4 which are illustrations of the rear of the automobile 10, the springs $12^a$ are also of the semi-elliptic type, there being two, one near each of the supporting wheels of the rear axle 20. For each of these springs 12ª is an equalizing and load distributing mechanism consisting of a relatively long forwardly extending link 21 and a relatively short rearwardly extending link 22. These links are pivotally connected at their lower ends as at 23 with a bracket plate 24 fixed to the rear axle.

The lugs 15ª of the links 21 and 22 are adapted to coact with a spring 16ª which is the equivalent of the spring 16 previously referred to and which said spring is loosely mounted at its center to a pin 17 on said bracket 17ª. The links 21 and 22 correspond in function to the links 14—14 so that the loads taken up by these springs 12ª are distributed to the respective ends thereof. Very satisfactory results have been had in practice through the mounting of the front spring 12 longitudinally with the front axle 11 and the rear springs 12ª at right angles to the rear axle or longitudinally with respect to the body of the vehicle. In this manner of mounting the three springs the body of the vehicle is capable of universal-like movements or undulatory action incident to the stresses or loads and vibrations transmitted thereto. In view of this fact any force applied to a particular spring is indirectly transferred to a very appreciable extent to the remaining springs of the vehicle.

I claim:

1. A semi-elliptical spring adapted to be interposed between the body of a vehicle and its axle, and links pivoted to the respective ends of the spring and adapted to be pivotally connected with the axle, means for limiting the movements of the links upon the axle, and yielding means adapted to be mounted upon the axle and to engage with said links to urge same in one direction.

2. Mechanism of the class described comprising, in combination with the axle of a vehicle, of a plurality of links pivoted to said axle and extending respectively in opposite directions from the axle and adapted to pivotally engage with the respective ends of a semi-elliptical spring, and spring means carried by the axle for urging the links in one direction, said spring means consisting of a resilient leaf whose ends engage with the respective links and whose intermediate portion is capable of being freely flexed and rendered responsive incident to movements imparted to said links.

3. The combination with a vehicle axle having a spring, of a pair of links having lower ends pivoted to the axle, said links associated with said spring and the latter functioning to urge the links in one direction, the upper ends of the links adapted to be pivotally connected with the respective ends of a semi-elliptic body supporting spring, and means on the links adapted to coact with the axle to limit motions of the links in one direction.

CHARLES E. C. EDEY.